(12) United States Patent
Barrow et al.

(10) Patent No.: US 8,947,010 B2
(45) Date of Patent: Feb. 3, 2015

(54) DIMMER DECODER WITH LOW DUTY CYCLE HANDLING FOR USE WITH LED DRIVERS

(75) Inventors: Steven M. Barrow, Longmont, CO (US); James H. Masson, Boulder, CO (US); Irwin R. Nederbragt, Brighton, CO (US)

(73) Assignee: Nationl Semiconductor Corporation, Santa Clara, CA (US)

( * ) Notice: Subject to any disclaimer, the term of this patent is extended or adjusted under 35 U.S.C. 154(b) by 1056 days.

(21) Appl. No.: 12/904,560

(22) Filed: Oct. 14, 2010

(65) Prior Publication Data

US 2011/0084622 A1    Apr. 14, 2011

Related U.S. Application Data

(60) Provisional application No. 61/278,914, filed on Oct. 14, 2009.

(51) Int. Cl.
H05B 41/24        (2006.01)
H05B 33/08        (2006.01)

(52) U.S. Cl.
CPC ........ H05B 33/0815 (2013.01); H05B 33/0845 (2013.01); Y02B 20/346 (2013.01)
USPC ......................... 315/250; 315/209 R; 315/291

(58) Field of Classification Search
USPC .............. 315/209 R, 250, 291, 294, 297, 307
See application file for complete search history.

(56) References Cited

U.S. PATENT DOCUMENTS

| 7,038,399 B2 | 5/2006 | Lys et al. |
| 2006/0198172 A1 | 9/2006 | Wood |
| 2006/0208667 A1 | 9/2006 | Lys et al. |

(Continued)

FOREIGN PATENT DOCUMENTS

| CN | 1843061 | 10/2006 |
| EP | 1892698 | 2/2008 |

(Continued)

OTHER PUBLICATIONS

Notification of Transmittal of The International Search Report and The Written Opinion of the International Searching Authority, or the Declaration dated Jun. 1, 2011 in connection with International Patent Application No. PCT/US2010/052590.
Matthew Reynolds, "LM3445 Off-Line TRIAC Dimmer LED Driver Demo Board", National Semiconductor Corporation, Apr. 14, 2009, 8 pages.
"LM3445 Off-Line TRIAC Dimmer LED Driver Reference Design", National Semiconductor Corporation, Feb. 2009, 9 pages.
"Triac Dimmable Offline LED Driver", National Semiconductor Corporation, Mar. 23, 2009, 26 pages.
"SSL2101, SMPS IC for dimmable LED lighting", NXP, B.V., Aug. 28, 2009, 22 pages.
Taiwan Search Report.

*Primary Examiner* — Tung X Le
*Assistant Examiner* — Jonathan Cooper
(74) *Attorney, Agent, or Firm* — Andrew Viger; Frederick J. Telecky, Jr.

(57) ABSTRACT

A method includes receiving a sense signal having multiple pulses, where the sense signal is based on an output of a dimmer. The method also includes, for each of multiple sampling periods, (i) identifying a pulse duty cycle by sampling at least one pulse in the sense signal and calculating a duty cycle of the at least one pulse and (ii) generating an output value identifying a duty cycle for driving one or more LEDs. The output value is based on the pulse duty cycle. The method further includes generating a holding current for the dimmer (i) during the sampling of the at least one pulse in at least one of the sampling periods and (ii) when the pulse duty cycle is less than a specified threshold. The holding current can be applied continuously when the pulse duty cycle is less than the specified threshold (such as 15%).

20 Claims, 10 Drawing Sheets

(56) References Cited

U.S. PATENT DOCUMENTS

| | | |
|---|---|---|
| 2007/0138971 A1 | 6/2007 | Chen |
| 2007/0296354 A1 | 12/2007 | Okabe |
| 2008/0150450 A1 | 6/2008 | Starr et al. |
| 2008/0224633 A1 | 9/2008 | Melanson et al. |
| 2008/0258647 A1 | 10/2008 | Scianna |
| 2009/0033243 A1 | 2/2009 | Gater |
| 2009/0134817 A1 * | 5/2009 | Jurngwirth et al. ........... 315/307 |
| 2009/0160358 A1 | 6/2009 | Leiderman |
| 2009/0195168 A1 | 8/2009 | Greenfeld |
| 2009/0278473 A1 * | 11/2009 | Van Erp ........................ 315/294 |

FOREIGN PATENT DOCUMENTS

| | | |
|---|---|---|
| TW | 200643679 | 12/2006 |
| TW | 200820203 | 5/2008 |
| TW | M358469 | 6/2009 |

* cited by examiner

| FIG. | FIG. |
|---|---|
| 4A | 4B |

US 8,947,010 B2

DIMMER DECODER WITH LOW DUTY CYCLE HANDLING FOR USE WITH LED DRIVERS

CROSS-REFERENCE TO RELATED APPLICATION AND PRIORITY CLAIM

This application claims priority under 35 U.S.C. §119(e) to U.S. Provisional Patent Application No. 61/278,914 filed on Oct. 14, 2009, which is hereby incorporated by reference.

TECHNICAL FIELD

This disclosure relates generally to lighting systems. More specifically, this disclosure relates to a dimmer decoder with low duty cycle handling for use with light emitting diode (LED) drivers.

BACKGROUND

Light emitting diodes (LEDs) are becoming more and more popular due to their low energy usage and their long operational lifespan. Often times, LEDs are used in areas where dimming of the LEDs is a desirable feature, such as in residential homes. However, conventional dimmer switches are often designed for use with incandescent or halogen light bulbs. When used with LEDs, conventional dimmer switches can suffer from various problems. For instance, conventional dimmer switches can cause flickering of the LEDs. Conventional dimmer switches are also often unable to dim the LEDs across the LEDs' full range of illumination.

BRIEF DESCRIPTION OF DRAWINGS

For a more complete understanding of this disclosure and its features, reference is now made to the following description, taken in conjunction with the accompanying drawings, in which.

DETAILED DESCRIPTION

FIGS. 1 through 12, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
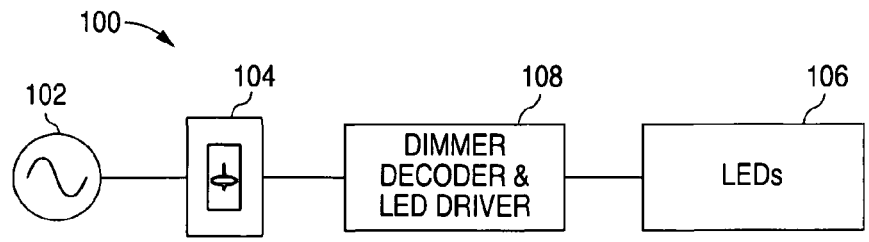
FIG. 1 illustrates an example light emitting diode (LED) system using a dimmer decoder in accordance with this disclosure.

FIG. 1 illustrates an example light emitting diode (LED) system 100 using a dimmer decoder in accordance with this disclosure. As shown in FIG. 1, an alternating current (AC) source 102 is coupled to a phase cut dimmer switch 104, which in this example contains a slider. Movement of the slider up could increase the brightness of one or more LEDs 106, while movement of the slider down could decrease the brightness of the LEDs 106. The AC source 102 includes any suitable source of AC power. The dimmer switch 104 includes any suitable phase cut dimming structure for controlling the dimming of one or more LEDs, such as a triac dimmer or a reverse phase dimmer. Each of the LEDs 106 includes any suitable semiconductor light-emitting structure. Any suitable number of LEDs 106 could be used, and the LEDs 106 could be arranged in any suitable configuration (such as in series, in parallel, or in series and in parallel).

The dimmer switch 104 is coupled to a dimmer decoder and LED driver 108. The dimmer decoder translates an output of the dimmer switch 104 into a value indicating the desired brightness of the one or more LEDs 106. The LED driver can drive the LEDs 106 to provide the desired brightness. While shown as a single functional unit here, the dimmer decoder and LED driver 108 could represent separate components. The dimmer decoder includes any suitable structure for decoding signals from a phase cut dimmer. Example embodiments of the dimmer decoder are described below. The LED driver includes any suitable structure for driving one or more LEDs.

Although FIG. 1 illustrates one example of an LED system 100 using a dimmer decoder, various changes may be made to FIG. 1. For example, while FIG. 1 represents one specific type of dimmer switch 104, other types of dimmer switches could be used (such as those without physical sliders). Also, the dimmer decoder and LED driver 108 could be used in any other suitable system.

Figure 2:
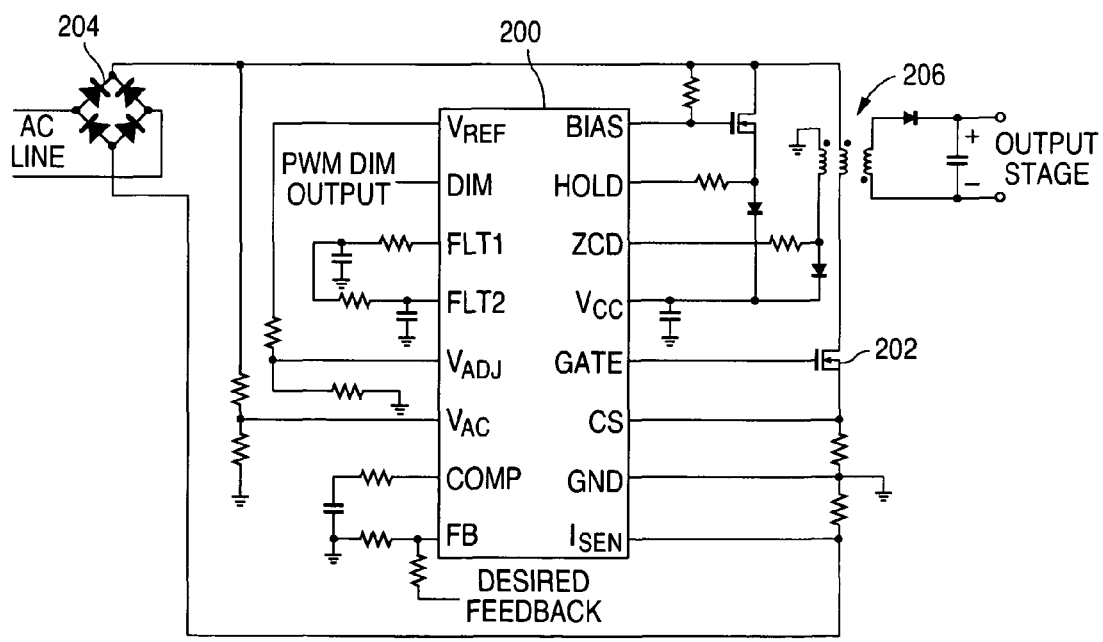
FIGS. 2 and 3 illustrate an example dimmer decoder in the LED system of FIG. 1 in accordance with this disclosure.
Figure 3:
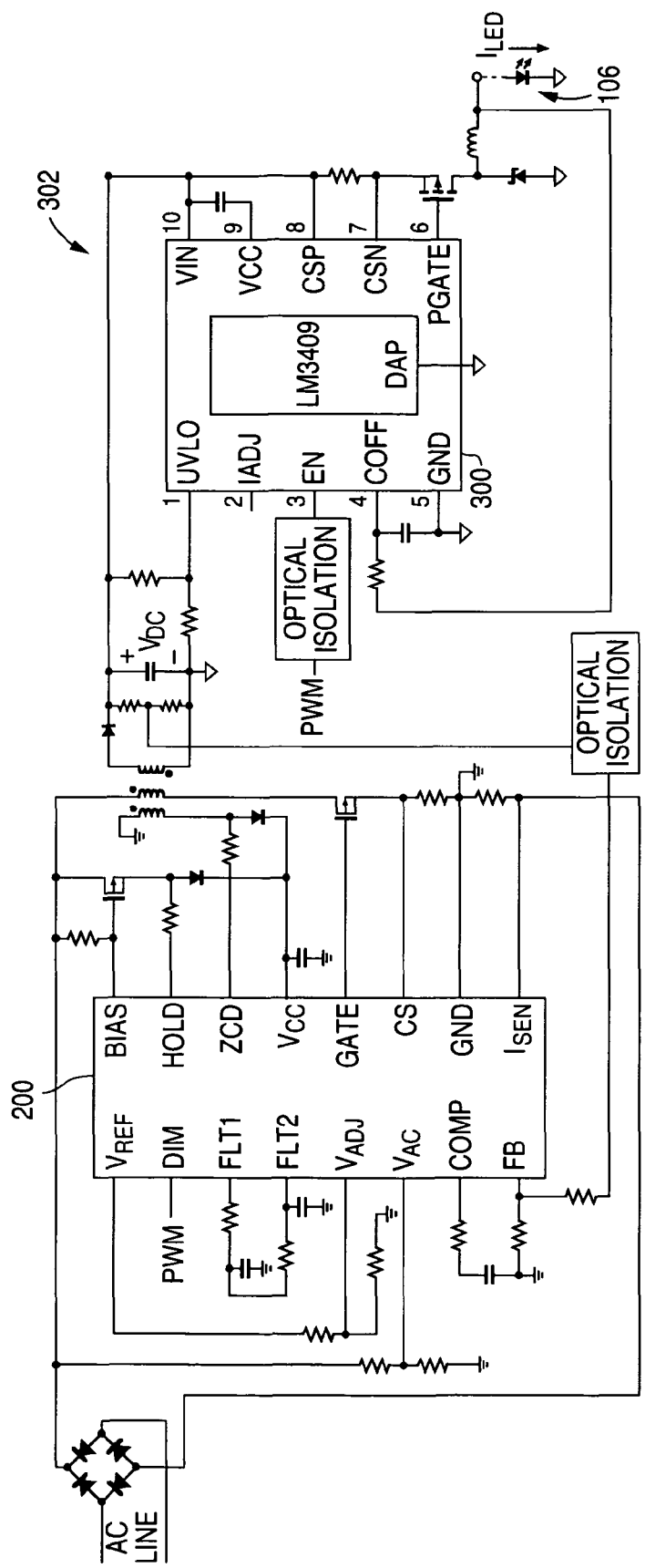

FIGS. 2 and 3 illustrate an example dimmer decoder in the LED system 100 of FIG. 1 in accordance with this disclosure. As shown in FIG. 2, the dimmer decoder is implemented as an integrated circuit chip 200. In this example, the integrated circuit chip 200 includes $V_{CC}$ and GND pins for receiving input and ground voltages, respectively. A GATE pin provides a signal for controlling a power transistor 202, such as a power MOSFET transistor.

A CS pin receives a current sense signal based on the current through the power transistor 202. An $I_{SEN}$ pin is coupled to a bridge return of a rectifier 204 and is used to sense the amount of return current for the rectifier 204. The measured amount of return current is used to generate a dynamic hold current, which is also provided to the bridge return of the rectifier 204 in order to help maintain the total return current above some specified level. A HOLD pin can be coupled to a hold resistor for defining the dynamic hold current. The dynamic hold current is described in more detail below.

A ZCD (zero cross detection) pin is coupled to a winding of a transformer 206 and is used to detect when all energy has been transferred in the transformer 206. A BIAS pin can be coupled to an external cascade transistor to aid with startup. For example, when the input voltage at the $V_{CC}$ pin is in an under-voltage condition, the BIAS pin can be clamped (such as at around 20V) to charge the $V_{CC}$ pin above an under-voltage lockout (UVLO) threshold. Once the threshold is crossed, the BIAS pin can be clamped at a lower voltage (such as around 14V).

An input signal from a phase cut dimmer (such as the dimmer switch 104) is received through the rectifier 204 at a $V_{AC}$ pin. A DIM pin provides a pulse width modulation (PWM) output signal or other modulated output signal identifying the desired brightness of the LEDs 106. The output signal could, for example, represent a 240 Hz or 500 Hz signal. The DIM pin could be coupled to a dimming input of an output stage LED driver directly or with isolation to provide decoded dimming.

A $V_{REF}$ pin provides a reference voltage (such as about 3V) that can be divided and provided to a $V_{ADJ}$ pin. The $V_{ADJ}$ pin supports an analog adjust (analog dimming), such as by receiving a 0-3V signal. In particular embodiments, if left open, the $V_{ADJ}$ pin can be internally biased to 3V, which forces a standard 70% dimming range. If a voltage under 3V is applied, the upper threshold can be extended to obtain a larger usable range of the dimmer. If a voltage under a threshold (such as 75 mV) is applied, the integrated circuit chip 200 can enter a low power mode.

Two filter pins FLT1 and FLT2 can be connected to external resistors and capacitors that define two low-pass or other types of filters. An FB pin receives feedback based on the current operation of the dimmer decoder. As particular examples, the FB pin could connect to the $V_{CC}$ pin via a resistive divider or to a flyback output voltage in the LED driver through optical isolation. The FB pin can be used to control a power factor correction (PFC) voltage loop. In particular embodiments, over-voltage protection is engaged if the voltage on the FB pin is 3V or more, and the integrated circuit chip 200 enters a shutdown mode if the voltage on the FB pin is below 178 mV. An error amplifier within the chip 200 and coupled to the FB pin could be disabled by placing a 5.1 kΩ or other resistor between the FB pin and ground to ensure that the voltage is between 178 mV and 356 mV. A COMP pin receives a compensation signal for adjusting the operation of the integrated circuit chip 200.

As shown in FIG. 2, the integrated circuit chip 200 is coupled to various diodes, capacitors, resistors, transistors, and transformers. Each of these components could include any suitable structure for performing the desired function(s). In this example, the transformer 206 couples the dimmer decoder to an output stage, such as an LED driver.

FIG. 3 illustrates the dimmer decoder of FIG. 2, where the integrated circuit chip 200 is used in conjunction with a particular output stage 300. In this example, the output stage 300 is implemented using an LM3409 PFET Buck Controller for High Power LED Drives from NATIONAL SEMICONDUCTOR CORPORATION. Collectively, the integrated circuit chip 200 and the output stage 300 can form the dimmer decoder and LED driver 108 of FIG. 1. As shown in FIG. 3, a feedback signal provided to the FB pin of the integrated circuit chip 200 is generated from an upper rail 302 of the output stage 300 (in which case the feedback signal represents the input voltage provided to the output stage 300). However, the feedback signal could be generated at any other suitable location.

Although FIGS. 2 and 3 illustrate one example of a dimmer decoder in the LED system 100 of FIG. 1, various changes may be made to FIGS. 2 and 3. For example, the circuits shown in FIGS. 2 and 3 are for illustration only. The integrated circuit chip 200 implementing a dimmer decoder could be used in any other suitable manner.

Figures 4, 4A:
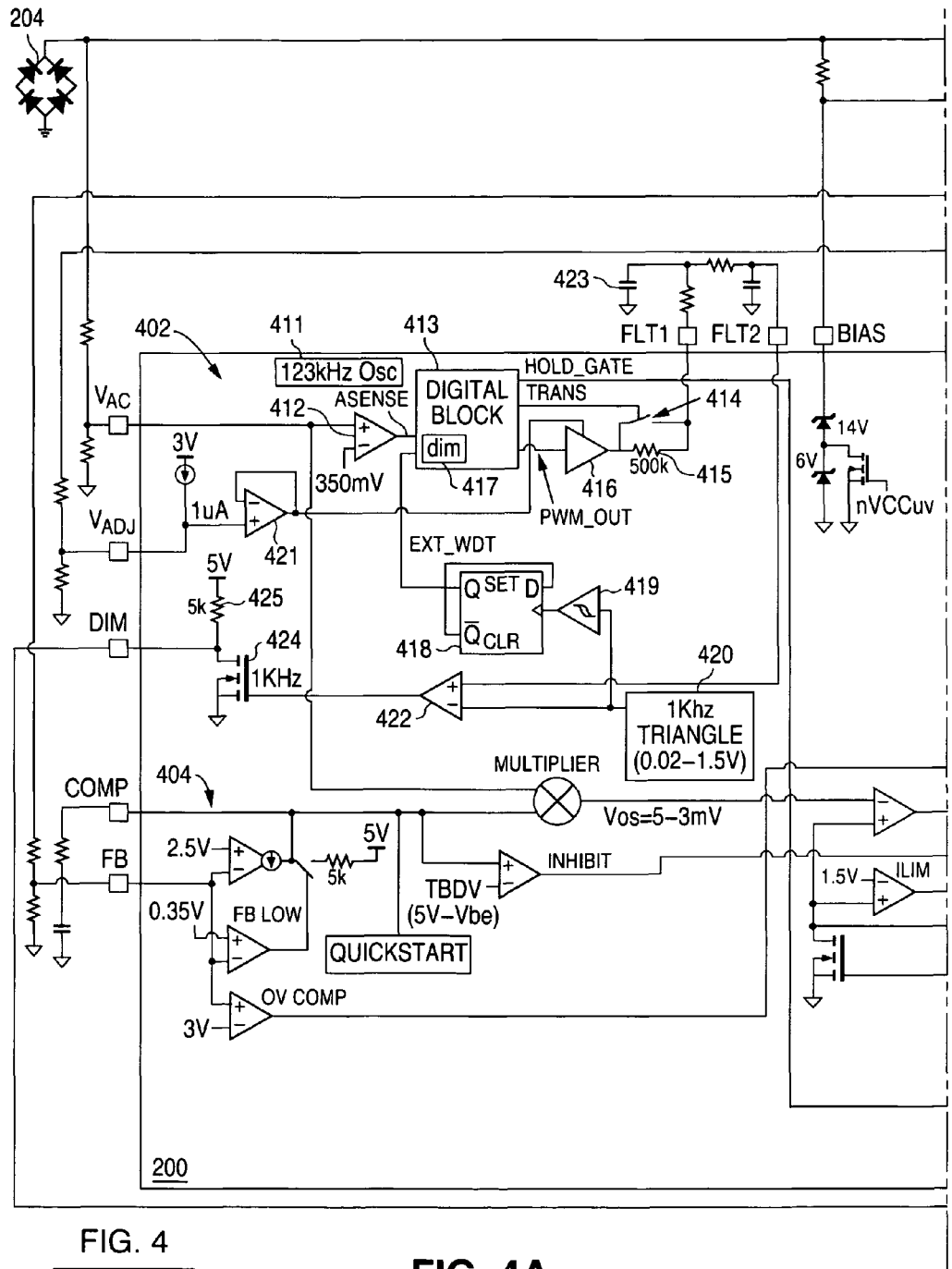
FIG. 4 illustrates an example integrated circuit chip implementing a dimmer decoder in accordance with this disclosure.
Figure 4B:
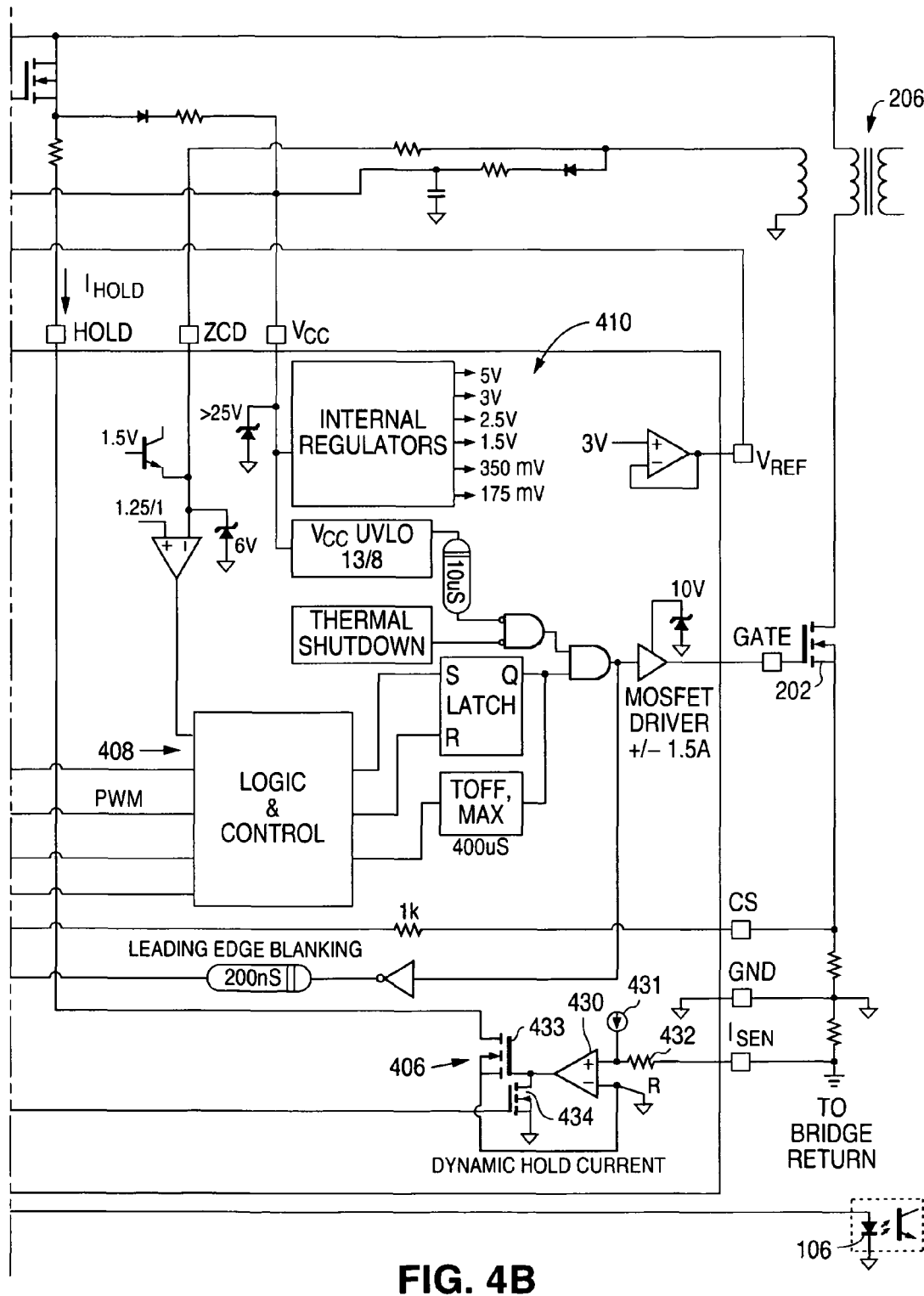

FIG. 4 illustrates an example integrated circuit chip 200 implementing a dimmer decoder in accordance with this disclosure. In this example, the integrated circuit chip 200 implements a dimmer decoder and separate PFC control. In particular embodiments, the PFC control operates in critical conduction mode using zero crossing detection to terminate off-time. Digital angle detection and dimming functions with a programmable dimming range, an analog dimming function, a sampled hold function, a dimming transition smoothing function, and a dimmer detect function can be supported. A precision reference, a pre-regulator bias, cycle-by-cycle current limiting, over-voltage protection, and thermal shutdown can also be provided.

As shown in FIG. 4, the integrated circuit chip 200 is generally divided into different subsections of circuitry. Dimmer decoder circuitry 402 generally includes circuit components for digitally decoding a signal received from a phase cut dimmer at the $V_{AC}$ pin and for generating a dimming signal that is output at the DIM pin. Compensation circuitry 404 generally includes circuit components for performing compensation (such as power factor correction) based on feedback. Dynamic hold current generation circuitry 406 generally includes circuit components for generating a dynamic hold current, which can be used during sensing of the signal from the phase cut dimmer by the decoder circuitry 402. Gate drive control circuitry 408 generally includes circuit components for generating a gate drive signal for driving the power transistor 202. Miscellaneous circuitry 410 generally includes circuit components for performing miscellaneous functions like over-voltage protection, under-voltage lockout, thermal shutdown, reference voltage generation, and bias generation.

Each of these circuitries 402-410 includes any suitable circuit components for performing the described functions. While specific circuit components are shown in FIG. 4, this is for illustration only, and other circuits that perform the same or similar functions could be used. Moreover, while specific values (such as voltages, currents, frequencies, resistances, and times) are shown in FIG. 4, these values are for illustration only. In addition, the circuit components used to implement various novel features are described in more detail below, while a discussion of other circuit components unrelated to those novel features is omitted as those circuit components are easily implemented by those skilled in the art.

Phase Cut Decoding

In this example, the dimmer decoder circuitry 402 includes a clock source 411, a comparator 412, and a digital block 413 (dimmer detect sample and hold). The clock source 411 represents any suitable source providing any suitable clock signal, such as a 123 kHz oscillator with a nominal frequency of 122.88 kHz. The comparator 412 compares a dimmer input signal received at the $V_{AC}$ pin to a threshold value, such as 350 mV. The comparator 412 generates an output signal denoted "asense," which is processed by the digital block 413 to perform dimmer decoding.

The digital block 413 operates to decode an incoming low-frequency duty cycle signal (such as a level-shifted and rectified version of the signal coming from the phase cut dimmer). The digital block 413 remaps that duty cycle to a higher-frequency PWM output signal (denoted "pwm_out") with a similar duty cycle. The digital block 413 also provides additional output signals (denoted "hold_gate" and "trans") for controlling a holding current through the dimmer switch and for switching between slow and fast low-pass output filters in the analog section through control of a switch 414 coupled across a resistor 415. A buffer/amplifier 416 couples the pwm_out output signal from the digital block 413 to the switch 414 and the resistor 415.

In some embodiments, the digital block 413 includes or implements a top-level logic block 417 that is referred to as the "dim" block. In particular embodiments, in addition to various test inputs and outputs, the logic block 417 could have the following inputs and outputs.

```
input    clk_c        // Oscillator clock input
input    asense       // Rectified and level-shifted dimmer output
                      // (frequency could be 100 Hz/120 Hz nominal)
input    ext_wdt      // External clock input for watchdog timers
                      // (frequency could be 500 Hz nominal)
input    pwl_en       // Piecewise linear mapping enable
                      // (0 = linear, 1 = approximate exponential)
                      // (Could be internally tied high and always on)
input    bleeder_en   // Bleeder enable
                      // (Could be internally tied high and always on)
output   pwm_out      // PWM output (could be 240 Hz nominal)
output   hold_gate    // Hold gate output
output   trans        // Transition state active output
```

Here, the ext_wdt signal is provided by a D flip flop 418, which has a clock input coupled to an output of a Schmitt trigger 419. The Schmitt trigger 419 is coupled to a source 420 that provides a 1 kHz 0.02-1.5V sawtooth or triangle signal.

The buffer/amplifier 416 is biased by a comparator 421 coupled to the $V_{ADJ}$ pin and a 1 μA current source. The output signal provided at the DIM pin is generated using a comparator 422, which has an inverting input coupled to the source 420. The non-inverting input of the comparator 422 receives the pwm_out output signal from the digital block 413 as filtered by low-pass filters formed by components 423 and optionally the resistor 415. An output of the comparator 422 drives a transistor 424 (such as an open drain n-channel MOSFET) coupled in series with a resistor 425.

Figure 5:
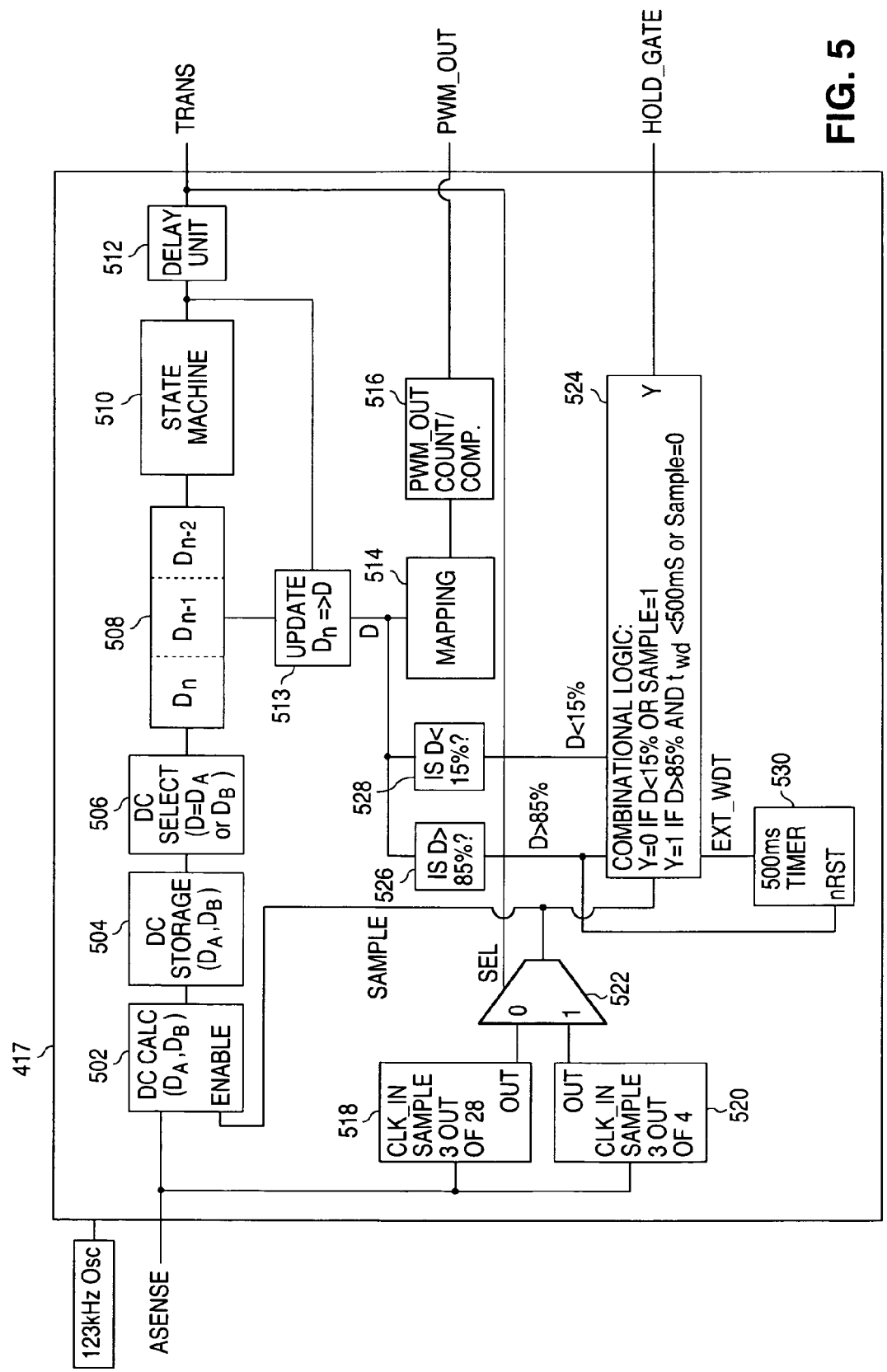
FIG. 5 illustrates an example logic block in the dimmer decoder of FIG. 4 in accordance with this disclosure.

FIG. 5 illustrates an example logic block 417 in the dimmer decoder of FIG. 4 in accordance with this disclosure. As shown in FIG. 5, the logic block 417 includes a duty cycle (DC) calculator 502, which could include asense high/period counter(s) and a divider. The duty cycle calculator 502 can calculate the duty cycle of an asense pulse during a sampling period. The logic block 417 also includes a duty cycle storage unit 504, which can store multiple duty cycles calculated during the sampling period. A duty cycle selector 506 selects one of the stored duty cycles from the storage unit 504. A storage unit 508 stores a specified number of most-recently selected duty cycles (prior to the currently-selected duty cycle). A state machine 510 controls the state in which the logic block 417 operates. A delay unit 512 can delay a falling edge in the trans output signal by a specified amount, such as one second.

An update unit 513 determines whether to output the current duty cycle calculation in order to update the pwm_out output signal. A mapping unit 514 can perform linear-to-piecewise linear (PWL) mapping of the duty cycle. A pwm_out counter and comparator unit 516 generates the pwm_out output signal.

Sampling of the asense signal is controlled by two clock units 518-520 and a multiplexer 522. The clock unit 518 generates a pulse that lasts for a specified number of pulses in the asense signal (such as three asense pulses), which occurs once for every 28 pulses of the asense signal. The clock unit 520 generates a pulse that lasts for the specified number of pulses in the asense signal (again such as three asense pulses), which occurs once for every four pulses of the asense signal. The multiplexer 522 selects which pulse to output in a Sample signal based on the state machine 510. The Sample signal controls when calculation of the duty cycles by the duty cycle calculator 502 occurs.

The hold_gate signal is generated using logic 524, which can include combinatorial logic and one or more watchdog timers. The logic 524 receives the Sample signal and input from two units 526-528, which determine whether the current duty cycle is greater than 85% or less than 15%, respectively. The logic 524 also receives input from a timer 530. In this example, the ext_wdt signal is generated internally by the logic block 417, although it could be generated externally as shown in FIG. 4 (in which case the timer 530 could be replaced by a unit that counts pulses in the ext_wdt signal).

In particular embodiments, counters in the logic block 417 could include nine-bit counters, and dividers in the logic block 417 could include nine-bit dividers (such as one implemented as a sequential divider, like the "DW_div_seq" SYNOPSYS DESIGNWARE component). Using nine-bit values, a duty cycle can be expressed as a value between 0 (0% duty cycle) and 511 (100% duty cycle). The logic block 417 could be implemented using hardware blocks, software or firmware logic executed by a processing or other computing device, or in any other suitable manner.

FIGS. 6 through 11 illustrate details regarding example operations of the digital block 413 in the dimmer decoder of FIG. 4 in accordance with this disclosure. These figures illustrate example operations of a particular embodiment of the logic block 417 in the digital block 413. Other embodiments of the logic block 417 or the digital block 413 could operate similarly or differently depending on the implementation.

Figure 6:
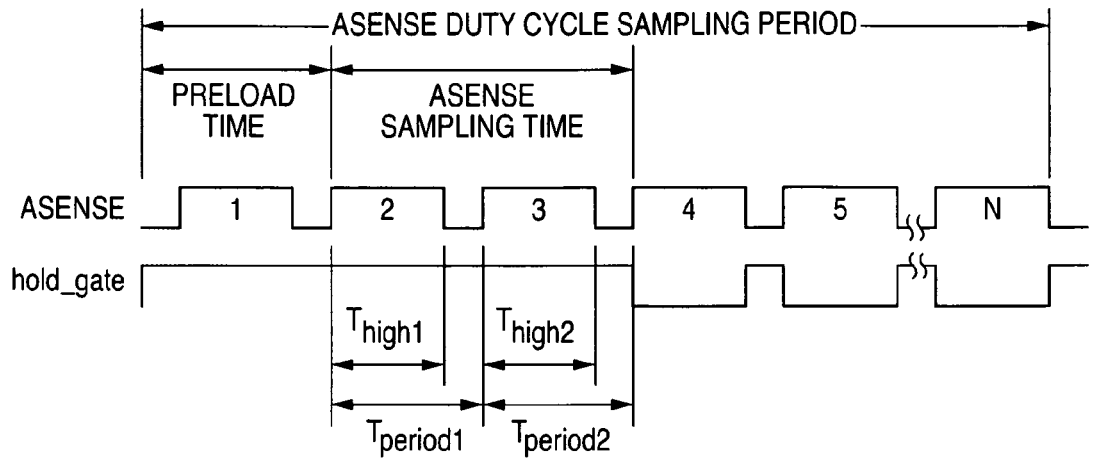
FIGS. 6 through 11 illustrate details regarding example operations of a digital block in the dimmer decoder of FIG. 4 in accordance with this disclosure.

As shown in FIG. 6, the digital block 413 operates as follows. Rising edges in the incoming asense signal (received from the comparator 412) are counted and used to control the state machine 510. During the first asense pulse of a sampling period, the hold_gate signal is turned on in order to preload the phase cut dimmer. This is done to obtain more accurate duty cycle readings during the following two asense pulses.

During each of the second and third asense pulses, a pulse high time ("$T_{high1}$" or "$T_{high2}$") and a pulse period ("$T_{period1}$" or "$T_{period2}$") are measured, such as by using the counter(s) in the duty cycle calculator 502. These values can be provided to the divider in the duty cycle calculator 502, which calculates the duty cycles of the second and third asense pulses. In the divider, each duty cycle can be calculated using one of the asense high times as the numerator and one of the total asense periods as the denominator. The two duty cycle values can be stored in the storage unit 504, and the selector 506 can select one of the stored duty cycle values (such as the larger value) as the current duty cycle of the dimmer. Following the third asense period, the hold_gate signal is turned off to remove the holding current through the dimmer, and the hold_gate signal may be pulsed high on subsequent asense low phases only if the bleeder_en input is high. As a result, the sampling of the dimmer's output is not occurring continuously, but rather is occurring at the beginning of each sampling period (after one or more initial pulses). Duty cycles for two consecutive asense pulses may be calculated since the dimmer can be an asymmetric device.

In this example, the length of the sampling period is variable depending on the current operation of the dimmer. For example, the sampling period could be four asense cycles, 28 asense cycles, or 240 or 250 ext_wdt cycles. In particular embodiments, if the state machine 510 is in a standby state and the current duty cycle is above a specified level (such as 85%), the duty cycle sampling can be controlled by a hold_gate low watchdog timer, and a sample can be taken once every 240 or 250 ext_wdt cycles (which could be approximately once every 480 ms or 500 ms). Alternatively, the sample can be taken once the timer 530 elapses. This can save power when the duty cycle is high, and at the same time force a periodic "dimmer detect" cycle. If the state machine 510 is in the standby state and the current duty cycle is at or below the specified level, the asense duty cycle can be sampled once every 28 asense cycles. If the state machine 510 is in a transition state, the asense duty cycle can be sampled once every four asense cycles. Operation of the state machine 510 is described below. Note that these conditions and sample rates are for illustration only. The same conditions could be associated with different sampling rates, and/or different conditions could be used.

Figure 7:
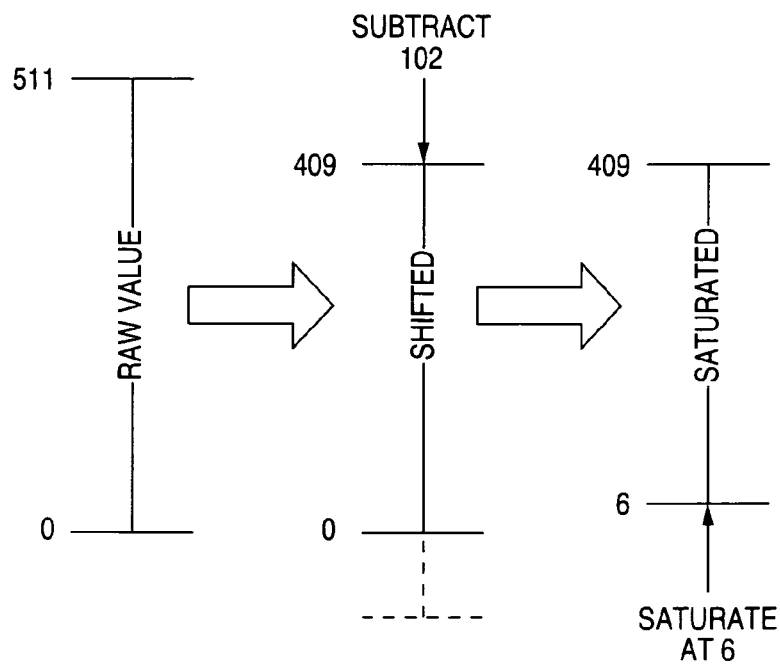

As shown in FIG. 7, the current duty cycle (the larger of the duty cycles selected by the duty cycle selector 506) can be shifted and saturated, possibly in the selector 506, the update unit 513, or other component. For a nine-bit duty cycle value, the value could be shifted down 20% by subtracting 102 (≈511×20%) from the current duty cycle value. The shifting can be done to improve the dimming range across various phase cut dimmer products. The resulting value can then be saturated at its low end at a minimum value, such as a value of six. When saturated at a value of six, this limits the amount of change in light to 16.7% or less at the low end when the duty cycle value changes by one least significant bit. For instance, when the duty cycle changes from six to seven, the resulting light output increases by ⅙ (16.7%). If it were allowed to change from five to six, this would be an increase of ⅕ (20%) and would result in an undesirable amount of abrupt change from one light level to the next. Here, a duty cycle value of zero could be treated as zero, while any duty cycle value greater than zero and less than the minimum value (1-5 in this example) could be set to the minimum value (6 in this example).

The shifted and saturated duty cycle value is then remapped to a different curve by the mapping unit 514. In some embodiments, the shifted and saturated duty cycle value is remapped to a four-slope PWL curve. This PWL curve is exponential at the lower end of the range of input values, and it is linear at the upper end of the range of input values. In particular embodiments, the exact equations used are shown in Table 1 (where x=linear and y=PWL). These slopes are chosen for their hardware simplicity since all of them are derived from combinations of powers of two, which translates into simple bit shifts and additions. Note, however, that other slopes or equations could be used.

TABLE 1

| Equation | Range |
|---|---|
| y = 6 | 0 ≤ x ≤ 5 |
| y = 0.25x + 5 | 6 ≤ x ≤ 126 |
| Y = x − 90 | 127 ≤ x ≤ 193 |
| y = 2.5x − 380 | 194 ≤ x ≤ 253 |
| y = x | 254 ≤ x ≤ 409 |

Figure 8:
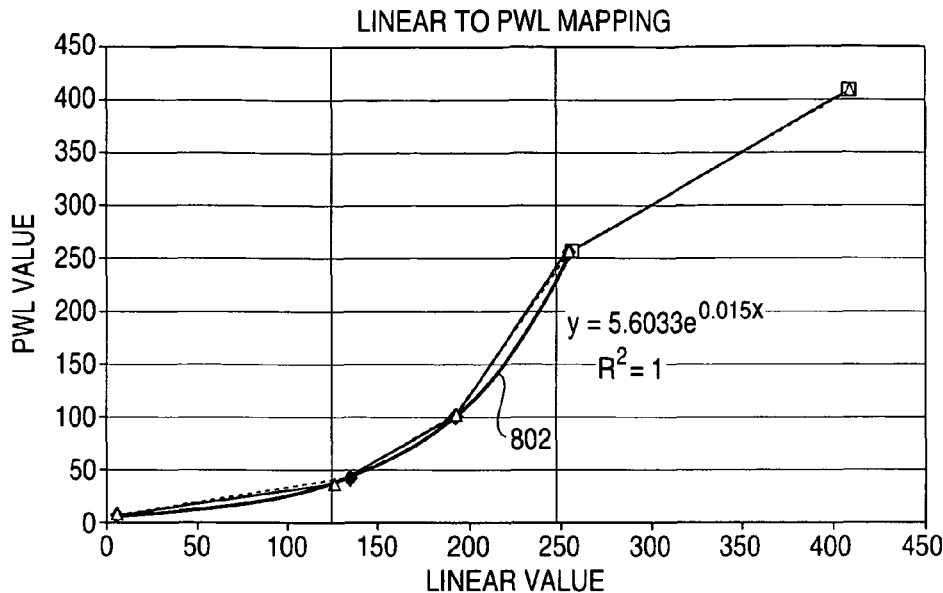

FIG. 8 illustrates a curvature of the linear-to-PWL mapping as compared to a "true" exponential curve defined by line 802 (where the actual exponential equation is expressed as $y=5.6033e^{0.015x}$). Of course, other equations could be used to approximate any other exponential curves.

The final pwm_out output signal can be generated using the signal from the clock source 411, and the pwm_out signal could have a nominal frequency of 240 Hz or 500 Hz. The pwm_out signal could be generated by the counter and comparator unit 516, which can continuously count from 0 to 511 and wrap. The count value of the counter is compared with the PWL-mapped output duty cycle value from the mapping unit 514. If the count value of the counter is less than the PWL-mapped duty cycle value, the pwm_out signal can be high; otherwise, it can be low.

Figure 9:
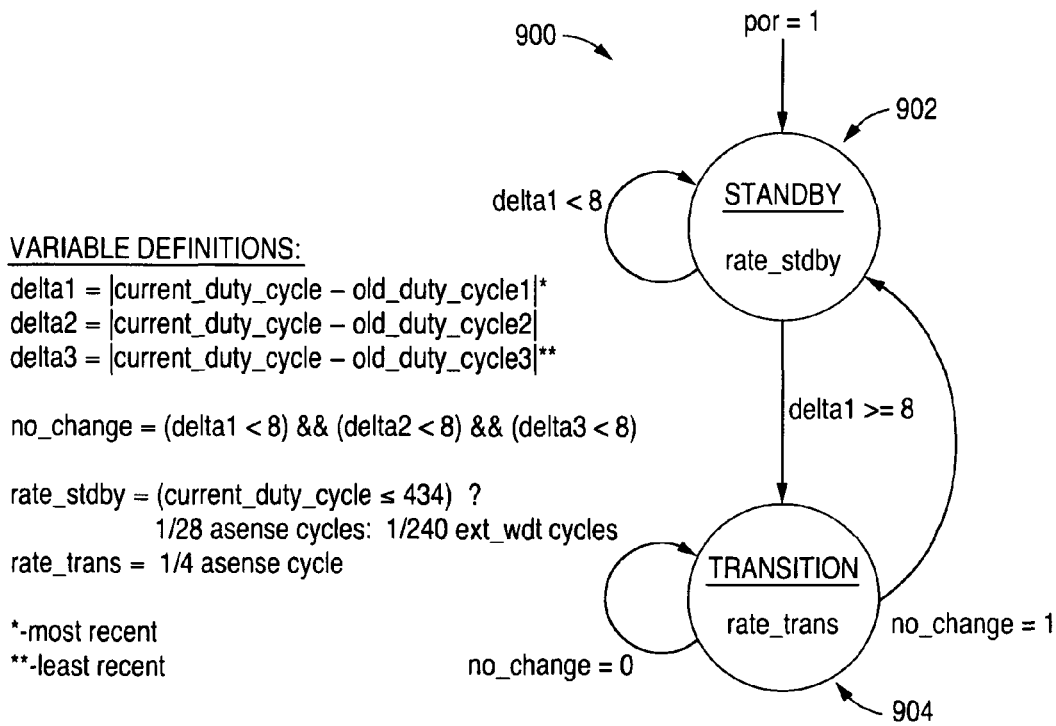
Figure 10:
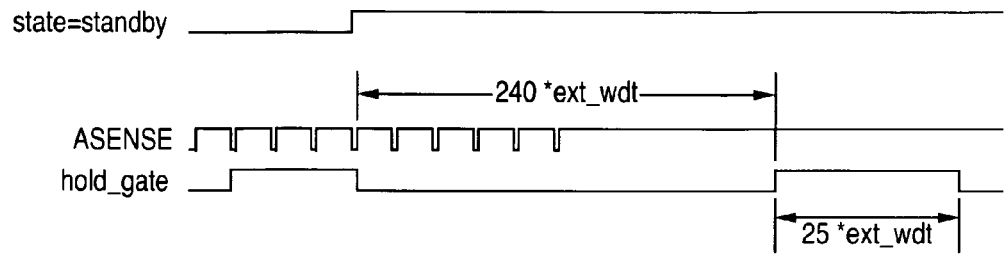

As noted above, the length of the sampling period can be variable depending on the state of the state machine 510. In some embodiments, the state machine 510 could have two states as shown in FIG. 9, which illustrates a transition diagram 900 for the state machine 510. In this example, the three most-recently computed duty cycles before shifting and saturation are saved in the storage unit 508, which could represent three registers. These values are used to calculate three delta values delta1, delta2, and delta3. A single delta calculator in the state machine 510 could be used sequentially three times. The delta values are used in determining which state the state machine 510 should be in: a standby state 902 or a transition state 904.

The state machine 510 controls how often the asense signal is sampled. In FIG. 5, this is done by controlling the operation of the multiplexer 522. The state machine 510 can remain in the standby state 902 until the delta between the most-recently saved duty cycle and the current duty cycle (delta1) is greater than or equal to a threshold value (such as eight). When this occurs, the state machine 510 switches to the transition state 904. The state machine 510 falls out of the transition state 904 when there has been "no change" for the last three delta calculations (delta1, delta2, and delta 3 are all smaller than the threshold).

Various watchdog timers can be used to force the dimmer decoder circuitry 402 to sample the asense signal. For example, if the hold_gate signal has been low for 240 or 250 consecutive ext_wdt periods, a hold_gate low watchdog timer (either the timer 530 or a timer in the logic 524) can force the hold_gate signal to go high, which forces a duty cycle measurement to occur. The hold_gate low watchdog timer can also force the hold_gate signal to go high 240 or 250 ext_wdt cycles after the hold_gate signal has fallen if the current duty cycle is above a threshold (such as 85%). This can be done to check for the presence of a phase cut dimmer when the brightness setting is high. The hold_gate low watchdog timer can be held in reset during an actual measurement pulse in the hold_gate signal (during the first three asense pulses), and it may not be reset with bleeder pulses in the hold_gate signal (during subsequent asense pulses after the sampling is completed). Note that the ext_wdt clock may have a high pulse width greater than a specified width, such as four times the pulse width in the clock signal from the source 411, in order for the pulse to be seen by the digital block 413.

A hold_gate high watchdog timer (such as one in the logic 524) can force the hold_gate signal low if the hold_gate signal has been high for 25 consecutive ext_wdt clock periods (approximately 50 ms). This can effectively limit the pulse width of the hold_gate signal to 50 ms or less. This helps to prevent prolonged high-current states from occurring and causing damage to the system. If the hold_gate high watchdog timer expires and the asense signal has been static during the measurement attempt, the duty cycle is updated with the corresponding value. In the case where the asense signal is static low, the duty cycle can be set to true zero, and the pwm_out output signal can be set low. In the case where the asense signal is static high, the duty cycle can be set to a specified value (such as 409, or ≈511−20%), and the pwm_out output signal can be pulsed at a duty cycle of $^{409}/_{512}$.

If the asense signal has been static (not toggling) for 250 ext_wdt cycles, an asense static watchdog timer expires 250 ext_wdt cycles after the asense signal has stopped toggling. This expiration causes a measurement cycle to occur. The hold_gate signal is brought high, and any asense rising edges are counted to look for the end of the measurement cycle (the fourth rising edge of the asense signal). The duty cycle is updated to the measured value only if there are exactly four rising edges of the asense signal before the hold_gate high watchdog timer expires.

When the asense signal toggles often enough to keep the asense static watchdog timer from expiring, the hold_gate signal can be brought high to start a normal measurement cycle when either of two conditions happen: (i) the internal asense rise count reaches its maximum value, or (ii) the hold_gate low watchdog timer expires 240 or 250 ext_wdt cycles after the hold_gate signal went low (see FIG. 10).

In this way, the digital block 413 can sample the output of the phase cut dimmer only during limited times, rather than continuously. The sampling can skip the first initial pulse(s) during a sampling period since those pulses can be unstable or less representative of the desired duty cycle. The sampling can also involve multiple subsequent pulses after the initial pulse(s), which allows the digital block 413 to take into account the asymmetric nature of the phase cut dimmer. The sampling can occur at different rates depending on how much the dimmer's output is changing, allowing faster sampling when the dimmer's output is changing more rapidly. The sampling can also be forced to occur at different times to make sure that the dimmer's output is being sampled.

Dynamic Hold Current Generation

Returning to FIG. 4, the dynamic hold current generation circuitry 406 includes a comparator 430 having an inverting input coupled to ground. The comparator 430 has a non-inverting input coupled to a current source 431 and a resistor 432, which is coupled to the $I_{SEN}$ pin. The comparator 430 drives a transistor 433, which is coupled to the HOLD pin and to the inverting input of the comparator 430.

The hold_gate signal drives a transistor 434, which is also coupled to the output of the comparator 430. When the hold_gate signal is asserted, this preloads the dimmer switch and helps generate a holding current. The holding current is used to help ensure that some minimum amount of current is flowing through the dimmer during sampling of the asense signal. Effectively, this switches a load into the signal path, which helps generate a cleaner asense signal for the dimmer decoder circuitry 402 to process. The holding current supplied to the dimmer during sampling can vary depending on the amount of current already being provided to the dimmer. If more current is already being provided, less holding current may be generated by the hold current generation circuitry 406.

Figure 11:
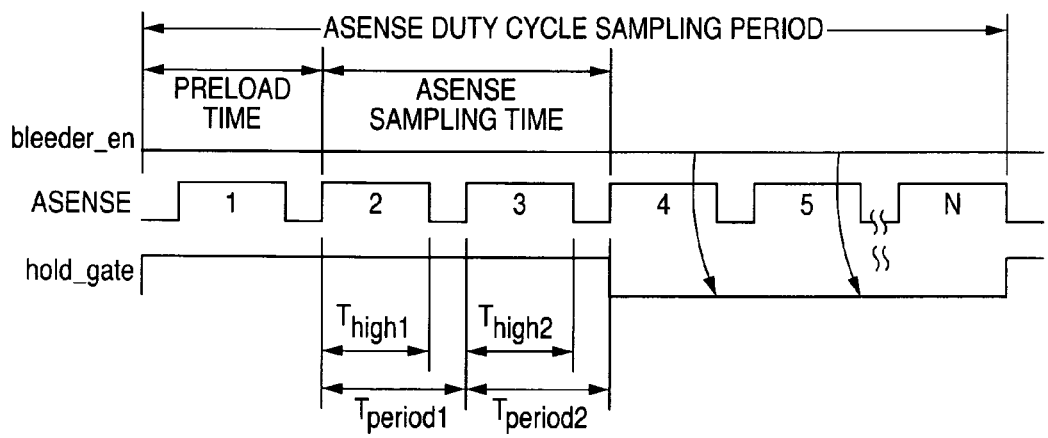

The hold_gate signal can be generated with an algorithm (such as in the logic 524), and its behavior can be modified by several special cases. In some embodiments, the hold_gate signal is normally high during the first three asense periods of the sampling period, and then it is the inverse of the asense signal when the bleeder_en input is tied high (see FIG. 6). However, if the bleeder_en input is low, the hold_gate signal may not be pulsed high during non-sampling asense low phases as shown in FIG. 11. This can be used as a metal mask option to allow disabling of the bleeder function.

Also, if the state machine 510 is in the standby state 902 and the current duty cycle is above a threshold (such as 85%), the hold_gate signal can be made low. In this state, the hold_gate low watchdog timer counts and causes the hold_gate signal to go high if it times out after 240 or 250 ext_wdt periods. The hold_gate signal can remain high until an asense falling edge is seen or the hold_gate high watchdog timer times out, whichever happens first.

Further, if the hold_gate low watchdog timer fires, the hold_gate signal can be made high. This may occur regardless of whether the asense signal is transitioning.

In addition, the hold_gate signal can be held high continuously as long as the current duty cycle is below a lower threshold value (such as 15% or $76/511$). At low brightness levels, a dimmer can misfire and create voltage ripples in its output, which would ordinarily cause changes in the brightness of the LEDs 106. By asserting the hold_gate signal at lower brightness, this maintains the generation of the holding current and the preloading of the dimmer, which can help force an asymmetric dimmer device to be more symmetric in its output power. The dimmer is therefore less likely to turn off prematurely with the presence of the holding current. Note that during this time, sampling of the asense signal can still occur as described above. However, power usage of the dimmer decoder would increase since the circuit is effectively generating an increased amount of holding current due to the continuous assertion of the hold_gate signal.

Variable Filter Speed

As noted above, the filter components 423 and optionally the resistor 415 are used to filter the pwm_out signal. These components control how fast the light output of the LEDs 106 can change or slew between consecutive duty cycle settings. With the resistor 415 in the circuit (when the switch 414 is opened), the filter components 423 may form a relatively slow filter. Without the resistor 415 in the circuit (when the switch 414 is closed), the resistor 415 changes the filter operation and effectively speeds up the filter, thereby forming a relatively fast filter.

In some embodiments, the trans output signal goes high when the state machine 510 enters the transition state 904, and the trans output signal goes low 500 ext_wdt cycles (approximately one second) after the state machine 510 leaves the transition state 904. This one second delay can be provided by the delay unit 512. Note that the trans output signal can remain high even after the state machine 510 leaves the transition state 904 as long as the duty cycle is above some threshold (such as 85%). This may allow, for example, 0-10V dimming to work at the module level.

The effect of the trans output signal is to stretch the time that the "fast" filter operates. For example, this may allow the fast filter to continue operating for about one second after the last dimmer adjustment. After this, the "slow" filter prevents visible flutter on the light level even when there are small changes in calculated duty cycles. This may be especially useful at low light levels, where even a single change in the least significant bit of the duty cycle can be noticeable to a user.

In this way, when the user attempts to change the brightness of the LEDs 106, the dimmer decoder can respond more quickly using the fast filter. Once the user stops changing the brightness, the slow filter can help prevent unwanted additional changes to the brightness.

Note that various changes may be made to the circuits shown in FIGS. 4-5 and to the diagrams shown in FIGS. 6-11. For example, the functional divisions shown in FIGS. 4-5 are for illustration only. Various components in FIGS. 4-5 could be combined, further subdivided, or omitted and additional components could be added according to particular needs. Also, more than one initial pulse in a sampling period could be disregarded, and duty cycles for more than two asense pulses could be calculated. Further, a duty cycle value could be shifted by any amount (it is not limited to a 20% shift), and the duty cycle value could be saturated at any minimum value (it is not limited to a value of six). In addition, the waveforms, times, and frequencies shown in the timing diagrams are for illustration only.

Figure 12A:
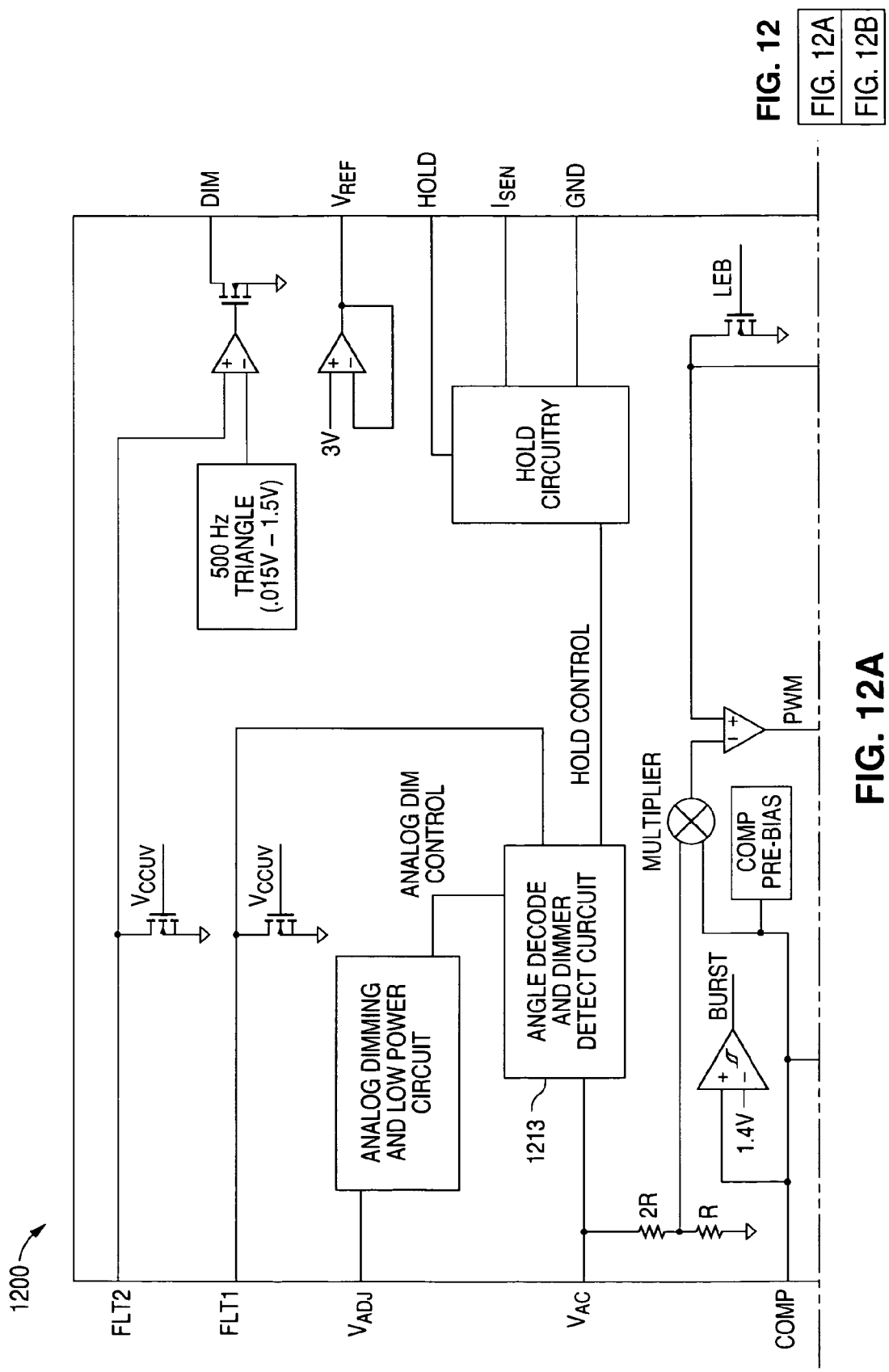
FIG. 12 illustrates another example integrated circuit chip implementing a dimmer decoder in accordance with this disclosure.
Figure 12B:
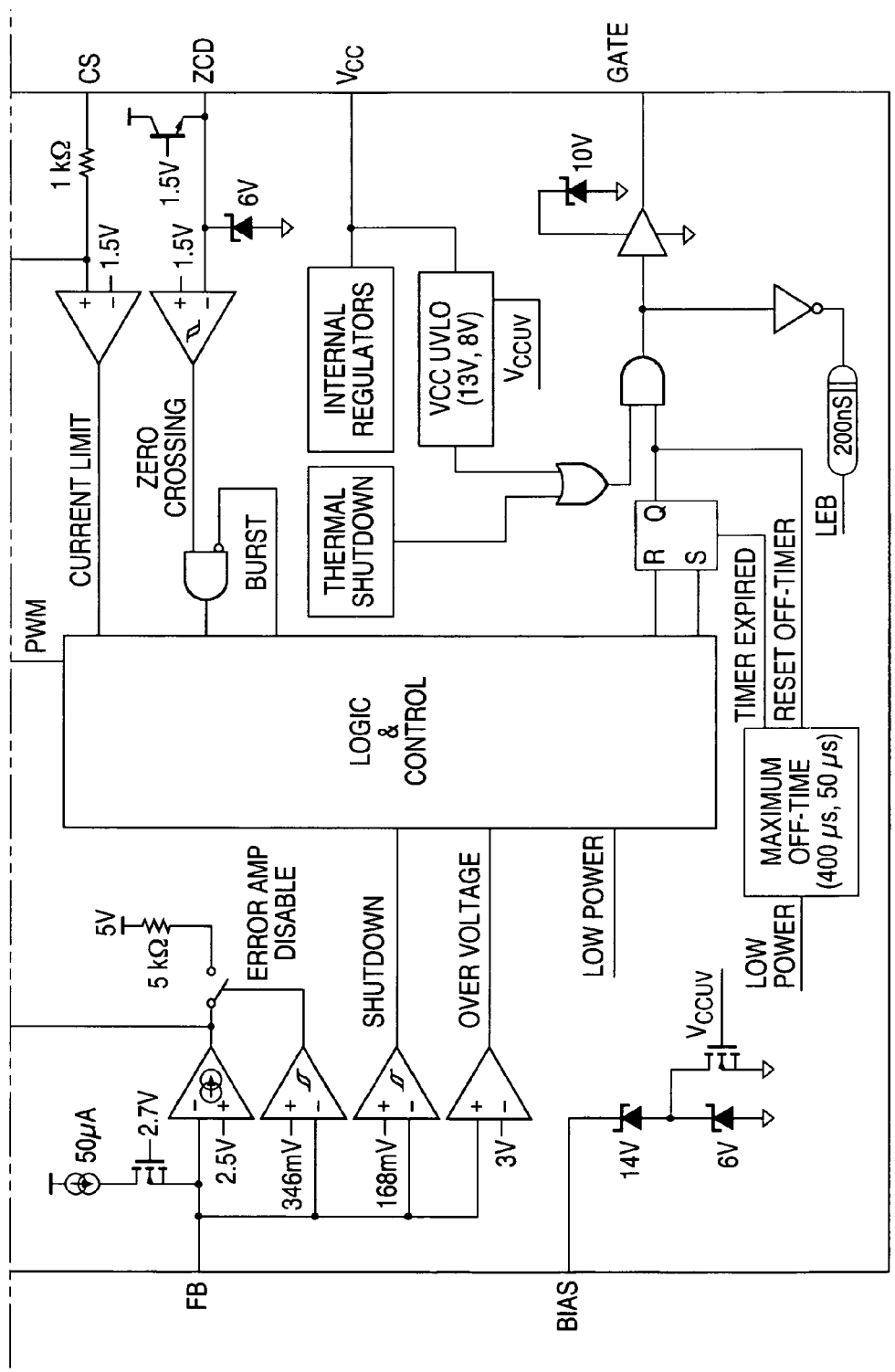

FIG. 12 illustrates another example integrated circuit chip 1200 implementing a dimmer decoder in accordance with this disclosure. The integrated circuit chip 1200 is similar in structure to the integrated circuit chip 200. Various components shown in FIG. 4 are grouped into blocks in FIG. 12. A circuit 1213 in FIG. 12 implements the digital block 413 of FIG. 4. The chip 1200 uses several different signals, voltages, currents, and threshold values (among other things) compared to the chip 200. The chip 1200 also includes various additional components, such as comparators that compare signals to 1.4V or 346 mV inputs. However, the chip 1200 may operate in a similar manner as the chip 200 as it relates to phase cut dimmer decoding, dynamic hold current generation, and variable speed filtering.

Note that while FIGS. 4 and 12 illustrate different integrated circuit chips, features of one chip can be implemented in the other chip. In some embodiments, associated support circuitry for either chip could include an active-high power-on reset pulse ("por"), a 122.88 kHz main oscillator ("clk_4x_c"), and a 500 Hz clock for the watchdog timers ("ext_wdt"). Additionally, the bleeder_en input may be tied high or low to enable or disable the bleeder functionality as noted above.

It may be advantageous to set forth definitions of certain words and phrases that have been used within this patent document. The term "couple" and its derivatives refer to any direct or indirect communication between two or more components, whether or not those components are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method adaptable for controlling illumination in an LED lighting system with multiple LEDs and a phase cut dimmer, comprising:
   receiving a dimmer sense signal with a dimmer duty cycle based on a dimmer phase angle;
   generating an LED drive signal with an LED duty cycle for driving an LED current to the LEDs, the LED duty cycle based on the dimmer duty cycle; and
   generating a holding current for the dimmer when the dimmer duty cycle is less than a specified threshold, including:
      generating a current sense signal corresponding to the LED current;
      generating a reference current corresponding to a minimum current through the dimmer; and
      generating the holding current based on a difference between the LED current and the reference current;
      such that a current through the dimmer corresponds to the reference current.

2. The method of claim 1, wherein the holding current generated when the dimmer duty cycle is less than the specified threshold reduces a likelihood that the dimmer turns off prematurely.

3. The method of claim 1, wherein the holding current is applied continuously when the dimmer duty cycle is less than the specified threshold.

4. The method of claim 1, wherein the specified threshold comprises a 15% duty cycle.

5. The method of claim 1, wherein identifying the dimmer duty cycle comprises:
   during each of multiple sampling periods of the dimmer sense signal,
      determining duty cycles of multiple pulses in the dimmer sense signal during that sampling period;
      selecting one of the determined duty cycles; and
      shifting the selected duty cycle by a specified amount; and saturating the shifted duty cycle at a minimum value greater than zero; and
   identifying as the dimmer duty cycle the shifted and saturated duty cycle.

6. The method of claim 5, wherein:
   if the shifted duty cycle equals zero, the dimmer duty cycle equals zero;
   if the shifted duty cycle is greater than the minimum value, the dimmer duty cycle equals the shifted duty cycle; and
   if the shifted duty cycle is greater than zero and less than the minimum value, the dimmer duty cycle equals the minimum value.

7. The method of claim 5, wherein the saturation prevents an increase or decrease of one in the dimmer duty cycle from causing a change in LED illumination that exceeds a maximum change.

8. The method of claim 7, wherein:
   the minimum value equals six; and
   the maximum change comprises a change in LED illumination of 16.7%.

9. A system operable to control illumination from multiple light emitting diodes (LEDs) operated with a phase cut dimmer, comprising:
   an LED driver configured to generate a drive signal for controlling the supply of LED current to control illumination from the LEDs; and
   a dimmer decoder configured to:
      receive a dimmer sense signal with a dimmer duty cycle based on a dimmer phase angle;
      generate an LED drive signal with an LED duty cycle for driving the LED current to the LEDs, the LED duty cycle based on the dimmer duty cycle; and
      generate a holding current for the dimmer when the dimmer duty cycle is less than a specified threshold, including:
         generating a current sense signal corresponding to the LED current;
         generating a reference current corresponding to a minimum current through the dimmer;
         generating the holding current based on a difference between the LED current and the reference current;
         such that a current through the dimmer corresponds to the reference current.

10. The system of claim 9, wherein the dimmer decoder is configured to reduce a likelihood that the dimmer turns off prematurely by generating the holding current when the dimmer duty cycle is less than the specified threshold.

11. The system of claim 9, wherein the dimmer decoder is configured to apply the holding current continuously when the dimmer duty cycle is less than the specified threshold.

12. The system of claim 11, wherein the specified threshold comprises a 15% duty cycle.

13. The system of claim 9, wherein the dimmer decoder is configured to identify the dimmer duty cycle by, during each of multiple sampling periods:
- determining duty cycles of multiple pulses in the dimmer sense signal during that sampling period;
- selecting one of the determined duty cycles;
- shifting the selected duty cycle by a specified amount; and saturating the shifted duty cycle at a minimum value greater than zero,
- identifying as the dimmer pulse duty cycle the shifted and saturated duty cycle.

14. The system of claim 13, wherein:
- if the shifted duty cycle equals zero, the dimmer duty cycle equals zero;
- if the shifted duty cycle is greater than the minimum value, the dimmer duty cycle equals the shifted duty cycle; and
- if the shifted duty cycle is greater than zero and less than the minimum value, the dimmer duty cycle equals the minimum value.

15. The system of claim 13, wherein the dimmer decoder is configured to perform the saturation to prevent an increase or decrease of one in the dimmer duty cycle from causing a change in LED illumination that exceeds a maximum change.

16. An apparatus operable to control illumination from multiple light emitting diodes (LEDs) operated with a phase cut dimmer, comprising:
- a digital block configured to:
  - receive a dimmer sense signal with a dimmer duty cycle based on a dimmer phase angle;
  - generate an LED drive signal with an LED duty cycle for driving an LED current to the LEDs, the LED duty cycle based on the dimmer duty cycle; and
- a dynamic hold current generation circuit configured to generate a holding current for the dimmer when the pulse duty cycle is less than a specified threshold, including:
  - generating a current sense signal corresponding to the LED current;
  - generating a reference current corresponding to a minimum current through the dimmer;
  - generating the holding current based on a difference between the LED current and the reference current;
  - such that a current through the dimmer corresponds to the reference current.

17. The apparatus of claim 16, wherein the dynamic hold current generation circuit is configured to reduce a likelihood that the dimmer turns off prematurely by generating the holding current when the dimmer duty cycle is less than the specified threshold.

18. The apparatus of claim 16, wherein the dynamic hold current generation circuit is configured to apply the holding current continuously when the dimmer duty cycle is less than the specified threshold.

19. The apparatus of claim 18, wherein the specified threshold comprises a 15% duty cycle.

20. The apparatus of claim 16, wherein the digital block is configured to identify the dimmer duty cycle by, during each of multiple sampling periods:
- determining duty cycles of multiple pulses in the dimmer sense signal during that sampling period;
- selecting one of the determined duty cycles;
- shifting the selected duty cycle by a specified amount; and saturating the shifted duty cycle at a minimum value greater than zero, the dimmer pulse duty cycle comprising the shifted and saturated duty cycle;
- the shifted duty cycle saturated such that the dimmer duty cycle cannot have a value greater than zero and less than the minimum value.

* * * * *